(12) United States Patent
Kwun et al.

(10) Patent No.: US 7,680,200 B2
(45) Date of Patent: Mar. 16, 2010

(54) TRANSCEIVING APPARATUS AND METHOD USING SPACE-FREQUENCY BLOCK-CODED SINGLE-CARRIER FREQUENCY DOMAIN EQUALIZATION

(75) Inventors: Jong-Hyung Kwun, Seoul (KR); Eung-Sun Kim, Suwon-si (KR); Jong-Hyeuk Lee, Seongnam-si (KR); Gi-Hong Im, Pohang-si (KR); Hui-Chul Won, Suwon-si (KR); Jin-Ho Jang, Pohang-si (KR)

(73) Assignees: Samsung Electronics Co., Ltd (KR); Postech Foundation (KR)

( * ) Notice: Subject to any disclaimer, the term of this patent is extended or adjusted under 35 U.S.C. 154(b) by 1028 days.

(21) Appl. No.: 11/387,415

(22) Filed: Mar. 23, 2006

(65) Prior Publication Data

US 2006/0215541 A1    Sep. 28, 2006

(30) Foreign Application Priority Data

Mar. 23, 2005    (KR) .................... 10-2005-0024137

(51) Int. Cl.
*H04K 1/10* (2006.01)
(52) U.S. Cl. ..................................................... 375/260
(58) Field of Classification Search ................. 375/260, 375/267, 299, 347
See application file for complete search history.

(56) References Cited

U.S. PATENT DOCUMENTS

| | | | |
|---|---|---|---|
| 6,377,632 B1 * | 4/2002 | Paulraj et al. | 375/299 |
| 6,452,981 B1 | 9/2002 | Raleigh et al. | |
| 6,834,043 B1 | 12/2004 | Vook et al. | |
| 7,280,604 B2 * | 10/2007 | Giannakis et al. | 375/260 |
| 2003/0095573 A1 | 5/2003 | Vook et al. | |
| 2006/0067419 A1 * | 3/2006 | Sandhu | 375/267 |
| 2007/0217546 A1 * | 9/2007 | Sandell et al. | 375/299 |

OTHER PUBLICATIONS

Al-Dhabir et al.: Three Space-Time Block-Coding Schemes for Frequency-Selective Fading Channels With Application to Edge; Vehicular Technology Conference.; Oct. 7-11, 2001; pp. 1834-1838.

* cited by examiner

*Primary Examiner*—Don N Vo
(74) *Attorney, Agent, or Firm*—The Farrell Law Firm, LLP

(57) ABSTRACT

Disclosed is a transceiving apparatus and method in which a space frequency block coding (SFBC) technique is applied to the SC-FDE technique. The transceiving method encodes an input signal into frequency-domain blocks so as to output at least two signal blocks in parallel to each other, inserts a cyclic prefix (CP) into the output signal blocks, and outputs the signal blocks through the same sub-channel using a corresponding antenna.

14 Claims, 6 Drawing Sheets

TRANSCEIVING APPARATUS AND METHOD USING SPACE-FREQUENCY BLOCK-CODED SINGLE-CARRIER FREQUENCY DOMAIN EQUALIZATION

PRIORITY

This application claims the benefit under 35 U.S.C. 119(a) of an application entitled "Transceiving Apparatus And Method Using Space-Frequency Block-Coded Single-Carrier Frequency Domain Equalization" filed in the Korean Intellectual Property Office on Mar. 23, 2005 and assigned Serial No. 2005-24137, the entire contents of which are incorporated herein by reference.

BACKGROUND OF THE INVENTION

1. Field of the Invention

The present invention relates to Single Carrier-Frequency Domain Equalization (SC-FDE), and more particularly to a transceiving apparatus and method capable of compensating for a distortion phenomenon resulting from a fast fading environment, by applying a Space Frequency Block Coding (SFBC) technique to the SC-FDE technique.

2. Description of the Related Art

A frequency-domain equalization (FDE) technique is a technique for removing interference in a fading channel environment. Recently, an FDE-based single-carrier transmission scheme has been adopted as a standard for broadband wireless metropolitan area network (MAN) systems, such as an IEEE 802.16 system, an ETSI HiperMAN system, etc. An SC-FDE scheme has a similar construction and performance to an Orthogonal Frequency Division Multiplexing (OFDM) scheme, and is robust against non-linear distortion and carrier synchronization. In addition, the SC-FDE scheme can simplify the structure of a user terminal upon uplink communication by simply processing a signal in a transmission section.

Meanwhile, studies and development are being conducted with respect to a transmission diversity technique, which can increase channel capacity and link reliability by spatially arranging a plurality of transmission antennas, without increasing a frequency bandwidth or transmission power. Recently, an SC-FDE technique, which employs a Space Time Bock Code (STBC) technique providing a transmission diversity gain, has been proposed. However, the STBC-based SC-FDE technique has a disadvantage in that this technique guarantees its performance only in a low-speed fading environment. Also, although the SFBC technique is more robust against a fading environment than the STBC technique, the SFBC technique has a technical problem, in that the SFBC technique cannot be directly applied to a single carrier system because it is a multi-carrier technique which applies a block code to a neighboring sub-channel or neighboring carrier.

SUMMARY OF THE INVENTION

Accordingly, the present invention has been made to solve the above-mentioned problems occurring in the prior art, and an object of the present invention is to provide a wireless communication system and method capable of compensating for any distortion phenomena caused in a fast fading environment and improving system performance while simplifying the construction of a transmitter, by employing single carrier-frequency domain equalization (SC-FDE) based on space frequency block coding (SFBC).

To accomplish this object, in accordance with one aspect of the present invention, there is provided a method for transmitting data in a communication system, which includes a transmission device and a reception device, in which the transmission device transmits a signal through at least two transmission antennas, and the reception device receives a signal through at least one reception antenna, the method including: encoding an input signal into frequency-domain blocks, and outputting at least two signal blocks in parallel to each other; and inserting a cyclic prefix (CP) into the output signal blocks, and outputting the signal blocks through each corresponding antenna by loading the signal blocks on a single carrier. Preferably, the step of outputting at least two signal blocks in parallel to each other further includes: demultiplexing N number of input signals to separate the input signals into even-numbered transmission samples and odd-numbered transmission samples, which have a period of N/2; shifting a phase of the odd-numbered transmission sample and adding the even-numbered transmission sample to the phase-shifted odd-numbered transmission sample, thereby generating a first signal block; performing a complex conjugate operation, phase shift, and transposition with respect to the even-numbered and odd-numbered transmission samples by applying the symmetric characteristic of a Fourier transformation to a frequency-domain block code, thereby generating a second signal block.

In accordance with another aspect of the present invention, there is provided a method for receiving data in a communication system, which includes a transmission device and a reception device, in which the transmission device transmits a signal through at least two transmission antennas, and the reception device receives a signal through at least one reception antenna, the method including: receiving signals output from at least two different transmission antennas through a single carrier by means of one reception antenna; removing a CP from the received signal; performing a serial to parallel conversion operation with respect to the CP-removed signal; performing Fourier transformation with respect to the parallel signals; detecting even-numbered frequency components and odd-numbed frequency components from the Fourier-transformed signal; performing a complex conjugate operation with respect to the odd-numbered frequency components, and combining the odd-numbered frequency components by a linear combiner; detecting a frequency component estimation value for a transmission signal from the linearly-combined frequency components based on a mean square error criterion through a channel equalizer; demultiplexing the detected frequency components; performing an N/2-point inverse Fourier transformation with respect to even-numbered frequency components of the demultiplexed frequency components; performing a complex conjugate operation with respect to odd-numbered frequency components of the demultiplexed frequency components; performing an N/2-point inverse Fourier transformation with respect to signals which have been subjected to the complex conjugate operation; and multiplexing N signals, which are output after being subjected to the inverse Fourier transformation, thereby restoring original data.

In accordance with still another aspect of the present invention, there is provided a communication system which includes a transmission device for transmitting a signal through at least two transmission antennas; and a reception device for receiving a signal through at least one reception antenna, wherein the transmission device includes a symbol mapping unit for mapping input information bits to symbols; a demultiplexer for demultiplexing the symbols output from the symbol mapping unit; a symbol processing unit for processing parallel symbols output from the demultiplexer, thereby outputting at least two signal blocks as frequency-domain blocks in parallel to each other; and a cyclic prefix (CP) insertion unit for inserting a CP into the signal blocks output in parallel from the symbol processing unit, and then transmitting the signal blocks.

In accordance with still another aspect of the present invention, there is provided a communication system which includes a transmission device for transmitting a signal through at least two transmission antennas; and a reception device for receiving a signal through at least one reception antenna, wherein the reception device includes a cyclic prefix (CP) removing unit for removing a CP from a received signal; a serial to parallel converter for performing serial to parallel conversion with respect to a signal, from which a CP is removed by the CP removing unit; a Fourier transform unit for performing Fourier transformation with respect to signals output in parallel from the serial to parallel converter; a signal combiner and a channel equalization signal detector for combining frequency-domain-blocked signals output from the Fourier transform unit, based on a minimum mean square error criterion; a demultiplexer for demultiplexing the frequency-band signals detected by the signal detector; a first inverse Fourier transform unit for performing inverse Fourier transformation with respect to an even-numbered frequency sub-channel of signals output from the demultiplexer; a complex conjugate operator for performing a complex conjugate operation with respect to an odd-numbered frequency component of signals output from the demultiplexer; a second inverse Fourier transform unit for performing inverse Fourier transformation with respect to an output signal of the complex conjugate operator; and a multiplexer for multiplexing output signals of the first and second inverse Fourier transform units, thereby restoring original data.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, a preferred embodiment of a transceiving apparatus and method—based on the space frequency block coding (SFBC) and single carrier-frequency domain equalization (SC-FDE)—according to the present invention will be described with reference to the accompanying drawings. In the following description of the embodiments of the present invention, a detailed description of known functions and configurations incorporated herein will be omitted when it may obscure the subject matter of the present invention.

Figure 1:
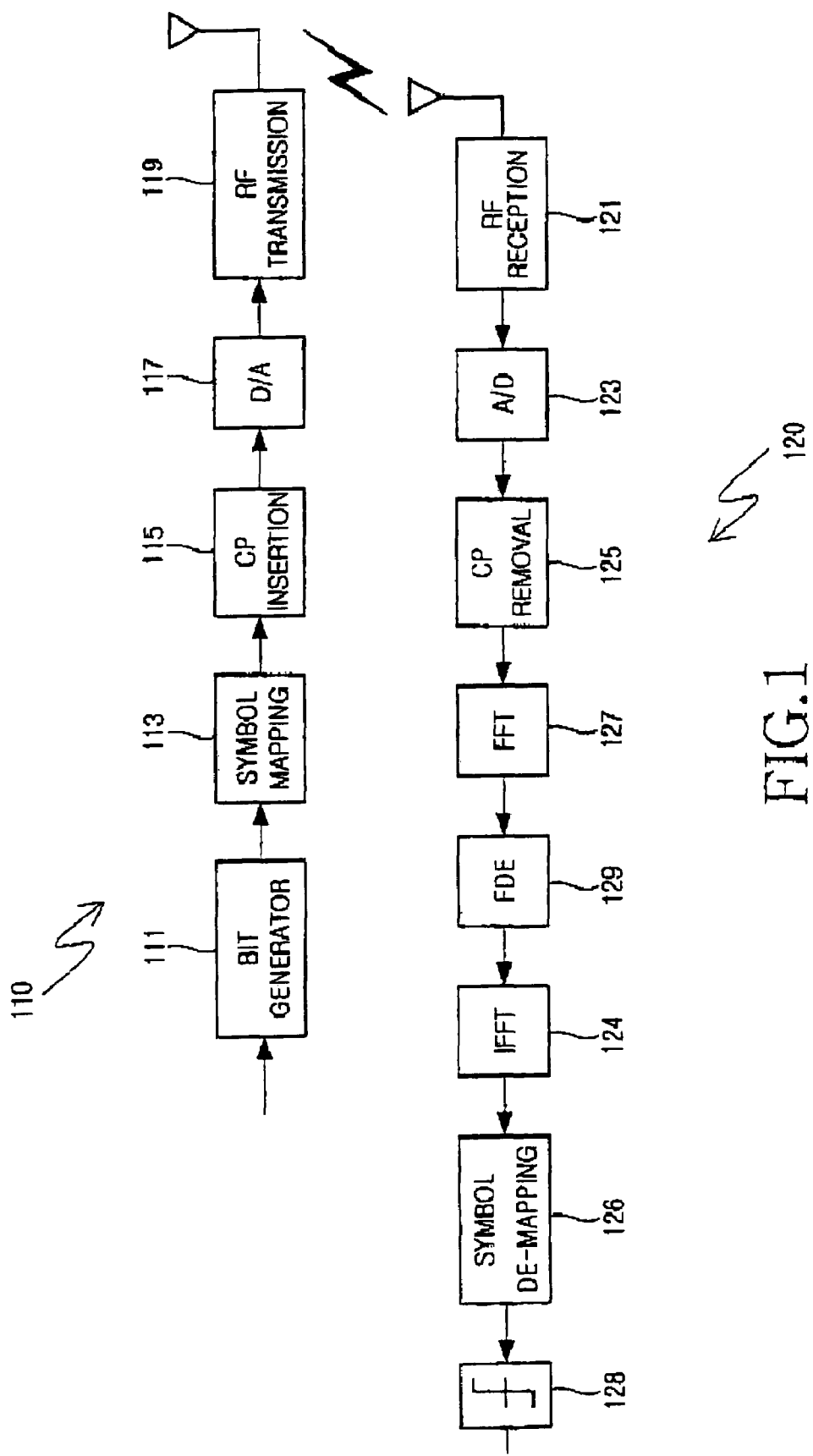
FIG. 1 is a block diagram schematically illustrating the construction of a single-transmission antenna single-carrier frequency-domain equalization system.

FIG. 1 is a block diagram schematically illustrating the construction of a single-transmission antenna single-carrier frequency-domain equalization system. The single carrier-frequency domain equalization (SC-FDE) system includes a transmission device 110 and a reception device 120. The transmission device 110 includes a bit generator 111, a symbol mapping unit 113, a cyclic prefix (CP) insertion unit 115, a digital/analog (D/A) converter 117, and an RF transmission unit 119. The bit generator 111 generates information bits. The symbol mapping unit 113 maps a bit stream, which is output from the bit generator 111, to a symbol having a predetermined length. The CP insertion unit 115 inserts a cyclic prefix (CP) into the symbol output from the symbol mapping unit 113, and the D/A converter 117 converts a digital signal output from the CP insertion unit 115 into an analog signal. The RF transmission unit 119 transmits the analog signal, which is output from the D/A converter 117, via a radio frequency.

The reception device 120 includes an RF reception unit 121, an analog/digital (A/D) converter 123, a CP removing unit 125, a Fourier transform unit 127, a frequency domain equalizer 129, an inverse Fourier transform unit 124, a symbol de-mapping unit 126, and a signal determination unit 128. The RF reception unit 121 receives a signal through a wireless channel. The A/D converter 123 converts an analog signal, which has been output from the RF reception unit 121, into a digital signal. The CP removing unit 125 removes a CP from a digital signal output from the A/D converter 123, and the Fourier transform unit 127 performs a Fourier transformation of a signal output from the CP removing unit 125. The frequency domain equalizer 129 performs an equalization of a signal output from the Fourier transform unit 127, and the inverse Fourier transform unit 124 performs inverse Fourier transformation of a signal output from the frequency domain equalizer 129. The symbol de-mapping unit 126 converts a symbol output from the inverse Fourier transform unit 124 into a bit stream, and outputs the converted bit stream. The signal determination unit 128 determines a transmission signal in consideration of the bit stream output from the symbol de-mapping unit 126.

In the communication system using a single-carrier scheme, as shown in FIG. 1, a CP has a length identical to that of a channel impulse response (CIR) modeled by an L-order frequency impulse response (FIR) filter. When it is assumed that a transmitted symbol vector is "x" in a block having a length of "N", a received symbol vector may be expressed as Equation 1.

$$r = Hx + n \quad (1)$$

Herein, 'n' represents an additive white Gaussian noise (AWGN), the average of which is zero. Channel matrix "H" having a size of "N×N" is a circulant matrix, the first row of which is configured with a vector obtained by adding "N-L" number of "0" to a channel impulse response. The channel matrix "H" is decomposed as shown in Equation 2.

$$H = W^H \Lambda W \quad (2)$$

Herein, "W" represents an orthonormal Fourier transformation matrix ($W^H W = W W^H = I_N$) having a size of "N×N", "$(\cdot)^H$" represents a complex conjugate transpose, and "Λ"

represents a diagonal matrix having Fourier transformation values of a channel impulse response.

According to the present invention, a 2×1 SC system having two transmission antennas and one reception antenna is illustrated. Since the communication system according to the present invention processes a transmission sequence in a time band, it is impossible to intactly employ the SFBC having been used in an Orthogonal Frequency Division Multiplexing (OFDM) scheme. Therefore, in the communication system according to the present invention, a SC transmission sequence having the same effect as the SFBC is designed and used.

Figure 2:
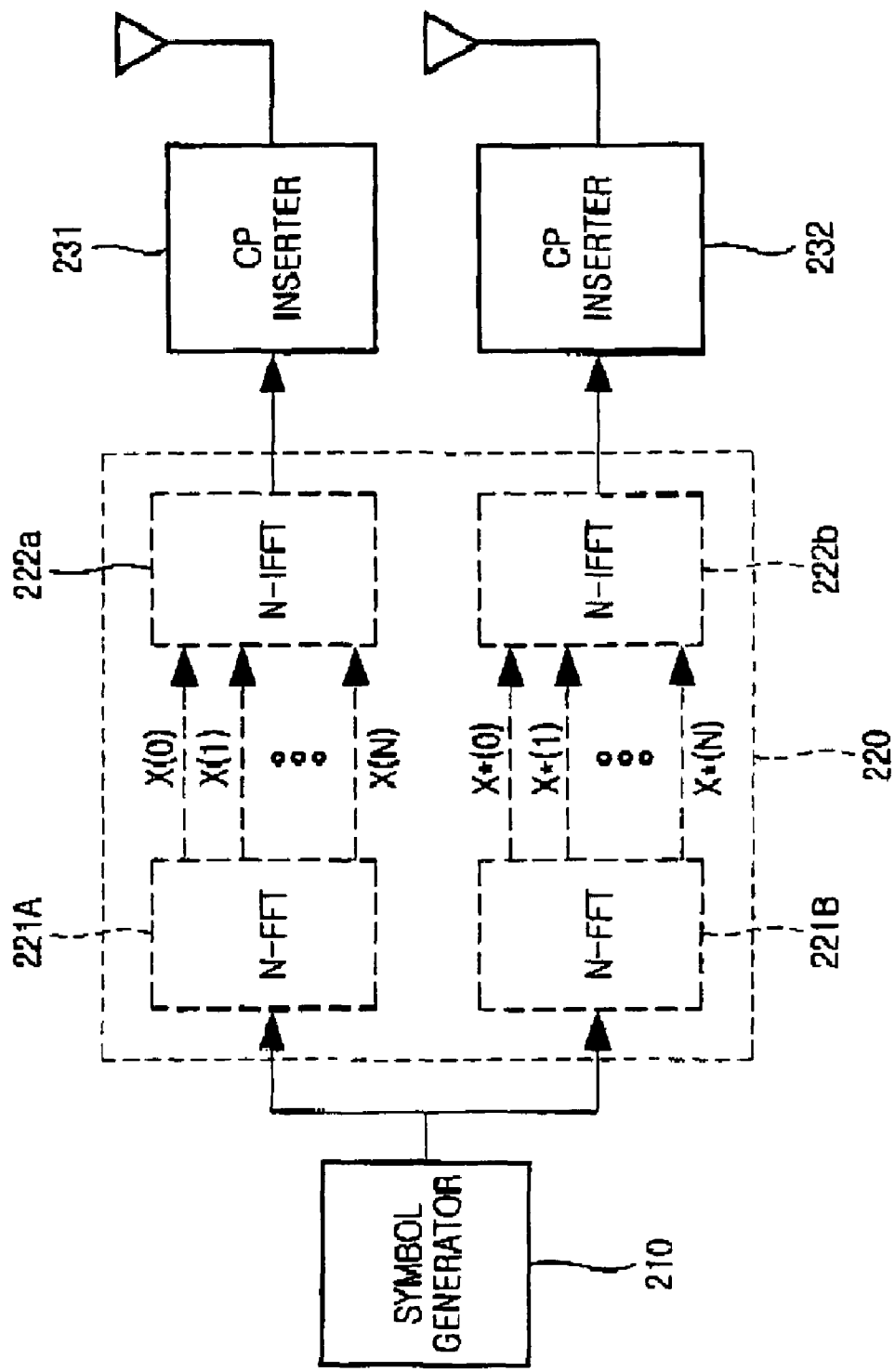
FIG. 2 is a block diagram illustrating the conceptual construction of a transmission device of a communication system according to an embodiment of the present invention.

FIG. 2 is a block diagram illustrating the conceptual construction of a transmission device of a communication system according to the present invention. When considering symbol transmission in a time band, rather than a frequency band, symbols output from a symbol generator 210 are processed by a virtual signal processing unit 220, which includes a pair of Fourier transform units 221A and 221B and inverse Fourier transform units 222A and 222B corresponding to the Fourier transform units 221A and 221B, respectively, and then are output as two signal streams. Each signal stream is input to each corresponding CP insertion unit 231 or 232, which inserts a CP into each signal steam, and then is output through an antenna. The virtual signal processing unit 220 shown in FIG. 2 is only a virtual element for illustrating a conception of generating a single-carrier transmission signal in a time band to which the SFBC is applied. That is, the transmission device according to the present invention does not include the virtual signal processing unit which contains two Fourier transform units and two inverse Fourier transform units. When block codes are applied with respect to two neighboring frequency sub-channels and two transmission antennas at the rear ends of the Fourier transform units 221A and 221B of the virtual signal processing unit, time-band transmission samples of each transmission antenna output through the inverse Fourier transform units 222A and 222B can be easily generated by using output symbols of the symbol generator 210 based on the symmetric characteristic of the Fourier transformation as expressed in Equation 3.

$$x^*(-n)_N \Leftrightarrow X^*(k), \text{ (herein, } n,k=1,\ldots,N-1\text{)} \tag{3}$$

When an $n^{th}$ symbol of a block transmitted from an $i^{th}$ antenna is expressed as $x_i(n)$, a transmission symbol of a first antenna may be expressed as Equation 4.

$$\begin{aligned}x_1(n) &= \frac{1}{\sqrt{N}} \sum_{k=0}^{N-1} X_1(k) W_N^{-nk} \\ &= \frac{1}{\sqrt{N}} \sum_{v=0}^{\frac{N}{2}-1} (X_1(2v) + W_N^{-n} X_1(2v+1)) W_{\frac{N}{2}}^{-nv} \\ &= \frac{1}{\sqrt{2}}(x^e(n) + W_N^{-n} x^o(n)) \text{(herein, } n = 0, 1, \ldots, N-1\text{)}\end{aligned} \tag{4}$$

Herein, $x^e(n)$ and $x^o(n)$ are defined as Equations 5 and 6, respectively.

$$x^e(n) = \sqrt{\frac{2}{N}} \sum_{v=0}^{\frac{N}{2}-1} X_1(2v) W_{\frac{N}{2}}^{-nv} \tag{5}$$

$$x^o(n) = \sqrt{\frac{2}{N}} \sum_{v=0}^{\frac{N}{2}-1} X_1(2v+1) W_{\frac{N}{2}}^{-nv} \tag{6}$$

Since $x^e(n)$ and $x^o(n)$ have a period of N/2 as a function of 'n', $x^e(n)$ and $x^o(n)$ can be replaced with $$x^e\left((n)_{\frac{N}{2}}\right) \text{ and } x^o\left((n)_{\frac{N}{2}}\right),$$

respectively.

In Equations 5 and 6, a scaling factor of an inverse Fourier transmission is adjusted so as to enable the normal transmission power to be "1". The transmission symbol of a second antenna may be expressed as Equations 7 and 8, based on Equations 3 and 4. It can be understood from the second and third rows in Equation 7 that the SFBC is applied.

$$\begin{aligned}x_2(n) &= \frac{1}{\sqrt{N}} \sum_{k=0}^{N-1} X_2(k) W_N^{-nk} \\ &= \frac{1}{\sqrt{N}} \sum_{v=0}^{\frac{N}{2}-1} (X_2(2v) + W_N^{-n} X_2(2v+1)) W_{\frac{N}{2}}^{-nv} \\ &= \frac{1}{\sqrt{N}} \sum_{v=0}^{\frac{N}{2}-1} (-X_1^*(2v+1) + W_N^{-n} X_1^*(2v)) W_{\frac{N}{2}}^{-nv} \\ &= \frac{1}{\sqrt{2}}\left(-\left(x^o\left((-n)_{\frac{N}{2}}\right)\right)^* + W_N^{-n}\left(x^e\left((-n)_{\frac{N}{2}}\right)\right)^*\right)\end{aligned} \tag{7}$$

(herein, $n = 0, 1, \ldots, N-1$)

Figure 3:
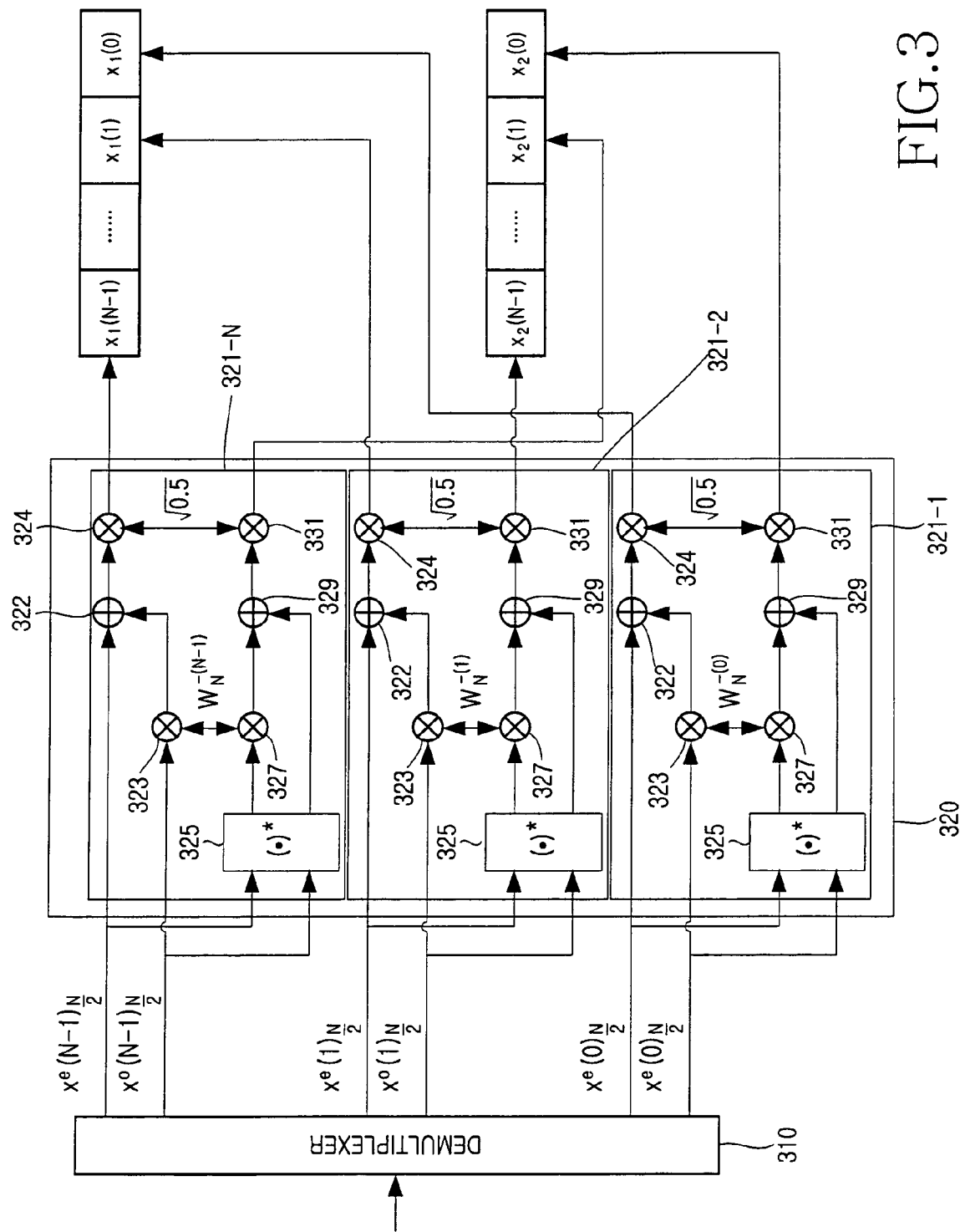
FIG. 3 is a block diagram illustrating the construction of a signal processing unit, which is substituted for the virtual signal processing unit shown in FIG. 2, according to an embodiment of the present invention.

FIG. 3 is a block diagram illustrating the construction of a signal processing unit, which is substituted for the virtual signal processing unit shown in FIG. 2, according to the present invention. When an actual transmission device is manufactured, the virtual signal processing unit is replaced with the signal processing unit shown in FIG. 3.

As shown in FIG. 3, the signal processing unit includes a demultiplexer 310 for demultiplexing symbols input from the symbol generator 210, and an operation unit 320 for processing signals output in parallel from the demultiplexer 310 and outputting the processed signals as a signal block.

In the case of QPSK symbols, the QPSK symbol is decomposed as shown in Equation 8.

$$x^e(l)=x(2l), x^o(l)=x(2l+1) \text{ (herein, } l=0,1,\ldots,N/2-1\text{)} \tag{8}$$

Referring to FIG. 3, the demultiplexer 310 outputs 0 to $(N-1)^{th}$ signals in parallel with a period of "N/2". Each signal input to the demultiplexer 310 is output as a pair of odd/even signals and then is input to the operation unit 320. The operation unit 320 includes N number of operation modules 321-1 to 321-N for processing each signal.

Each operation module includes a first multiplier 323, a second multiplier 327, a first adder 322, a second adder 329, a third multiplier 324, and a fourth multiplier 331. The first multiplier 323 multiplies an odd signal of relevant input signals by a phase shift coefficient. The second multiplier 327 multiplies an output signal of a complex conjugate transposer 325, which performs a complex conjugate transpose operation with respect to the odd and even signals, by the same phase shift coefficient as that used in the first multiplier 323. The first adder 322 adds an output signal of the first multiplier 323 and the even signal. The second adder 329 adds an output signal of the complex conjugate transposer 325 and an output signal of the second multiplier 327. The third multiplier 324 multiplies an output signal of the first adder 322 by a normalization factor, and the fourth multiplier 331 multiplies an output signal of the second adder 329 by the normalization factor.

The output signals $x_1(0), x_1(1), \ldots,$ and $x_1(N-1)$ of third multipliers 324, which are included in the operation modules 321-1, 321-2, ..., and 321-N of the operation unit 320, are output to a first CP insertion unit 231 as a first signal block, and the output signals $x_2(0), x_2(1), \ldots,$ and $x_2(N-1)$ of fourth multipliers 331 are output to a second CP insertion unit 232 as a second signal block. CPs are inserted into the first and second signal blocks by relevant CP insertion units 231 and 232, and the first and second signal blocks are output through first and second antennas, respectively. The CP is attached to the front end of each transmission block so as to lead a channel matrix to be a circulant matrix, and to remove interblock interference (IBI).

Figure 4:
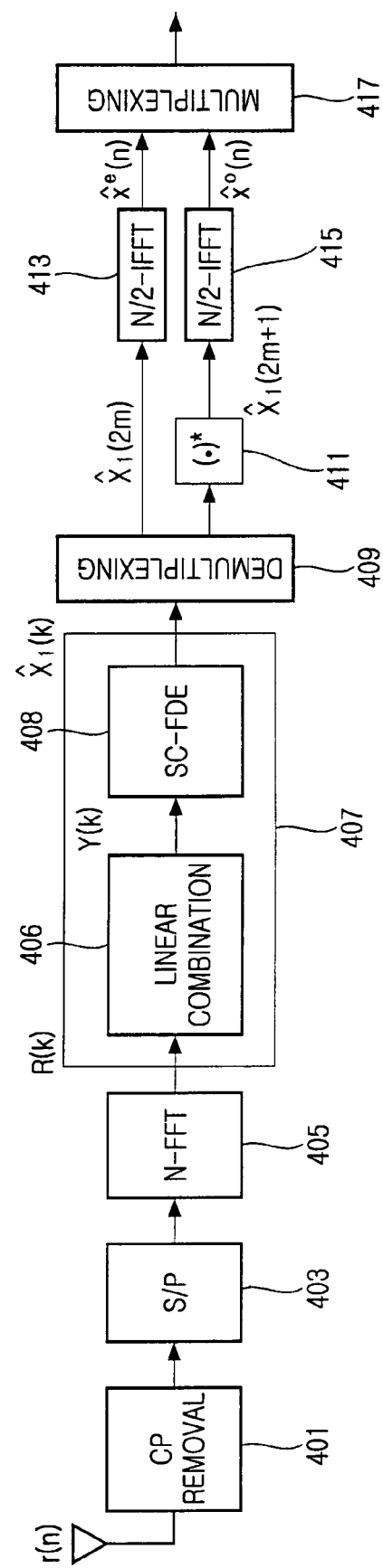
FIG. 4 is a block diagram illustrating the construction of a reception device of a communication system according to an embodiment of the present invention.

FIG. 4 is a block diagram illustrating the construction of a reception device of a communication system according to the present invention. The reception device shown in FIG. 4 has a construction corresponding to the virtual transmission device of FIG. 2 or the actually-realized transmission device of FIG. 3.

The reception device includes a CP removing unit 401, a serial to parallel converter 403, a Fourier transform unit 405, a signal detector 407, a first demultiplexer 409, a complex conjugate transposer 411, a first inverse Fourier transform unit 413, a second inverse Fourier transform unit 415, and a multiplexer 417. The CP removing unit 401 removes a CP from a signal received through an antenna, and the serial to parallel converter 403 performs serial to parallel conversion with respect to an output signal of the CP removing unit 401. The Fourier transform unit 405 performs n-point Fourier transformation with respect to parallel signals output from the serial to parallel converter 403, and the signal detector 407 detects a transmission signal from an output signal of the Fourier transform unit 405. The first demultiplexer 409 demultiplexes a signal detected by the signal detector 407. The complex conjugate transposer 411 performs a complex conjugate transpose operation with respect to odd-numbered frequency band detection signals of signals output from the first demultiplexer 409. The first inverse Fourier transform unit 413 performs N/2-point inverse Fourier transformation with respect to even-numbered frequency band detection signals of the signals output from the first demultiplexer 409. The second inverse Fourier transform unit 415 performs N/2-point inverse Fourier transformation with respect to an output signal of the complex conjugate transposer 411. The multiplexer 417 multiplexes the output signals of the first and second inverse Fourier transform unit 413 and 415, and outputs the multiplexed signal. The signal detector 407 includes a linear combiner 406 for combining output signals of the Fourier transform unit 405, and a single-carrier frequency domain equalizer 408 for performing frequency domain equalization with respect to an output signal of the linear combiner 406.

The linear combiner 406 of the signal detector 407 detects a signal by using a combining scheme based on minimum mean square error estimation, and a signal detected thereby may be expressed as Equation 9.

$$r = H_1 x_1 + H_2 x_2 + n \tag{9}$$

Herein, "$H_1$" and "$H_2$" represent channel matrixes of first and second transmission antennas, respectively. A signal of a frequency band obtained by multiplying the "r" by a Fourier transform matrix "W" is expressed as Equation 10.

$$R(k) = \Lambda_1(k)X_1(k) + \Lambda_2(k)X_2(k) + N(k), k=0,1,\ldots,N-1 \tag{10}$$

The signal of the frequency band obtained by Equation 10 is divided into even-numbered and odd-numbered frequency components as expressed in Equations 11 and 12, respectively.

$$\begin{aligned} R(2m) &= \Lambda_1(2m)X_1(2m) + \Lambda_2(2m)X_2(2m) + N(2m) \\ &= \Lambda_1(2m)X_1(2m) - \Lambda_2(2m)X_1^*(2m+1) + N(2m), \\ m &= 0, 1, \ldots, N/2 - 1 \end{aligned} \tag{11}$$

$$\begin{aligned} R(2m+1) &= \Lambda_1(2m+1)X_1(2m+1) + \Lambda_2(2m+1)X_2 \\ &\quad (2m+1) + N(2m+1) \\ &= \Lambda_1(2m+1)X_1(2m+1) + \Lambda_2(2m+1)X_1^* \\ &\quad (2m) + N(2m+1) \end{aligned} \tag{12}$$

When the complex conjugate of the odd-numbered frequency components "R(2m+1)", the following Equation 13 can be obtained.

$$R^*(2m+1) = \Lambda^*_1(2m+1)X^*_1(2m+1) + \Lambda^*_2(2m+1)X_1 \\ (2m) + N^*(2m+1) \tag{13}$$

When it is assumed that channel information about two adjacent frequency bands is constant, that is, when it is assumed that $\Lambda_1(2m) \approx \Lambda_1(2m+1)$ and $\Lambda_2(2m) \approx \Lambda_2(2m+1)$, Equations 11 and 13 may be expressed as a matrix equation of Equation 14.

$$\begin{aligned} R'_m &= \begin{bmatrix} R(2m) \\ R^*(2m+1) \end{bmatrix} \\ &= \begin{bmatrix} \Lambda_1(2m) & -\Lambda_2(2m) \\ \Lambda_2^*(2m) & \Lambda_1^*(2m) \end{bmatrix} \begin{bmatrix} X_1(2m) \\ X_1^*(2m+1) \end{bmatrix} \begin{bmatrix} N(2m) \\ N^*(2m+1) \end{bmatrix} \\ &= \Lambda'_m X'_m + N'_m \end{aligned} \tag{14}$$

A received signal can be expressed as a linear combination of transmission signals by Equation 14, so signal detection can be performed based on minimum mean square error criterion. A finally-obtained equation is expressed in a similar form to that of a reception diversity system using maximal ratio combining (MRC), that is, as Equation 15.

$$\begin{aligned} Y_m &= \Lambda'^H_m R'_m \\ &= \begin{bmatrix} \tilde{\Lambda}_m & 0 \\ 0 & \tilde{\Lambda}_m \end{bmatrix} X'_m + \tilde{N}, \\ \tilde{\Lambda}_m &= |\Lambda_1(2m)|^2 + |\Lambda_2(2m)|^2 \\ \hat{X}_m &= \left( \Lambda'^H_m \Lambda'_m + \frac{1}{SNR} I_2 \right)^{-1}, \\ Y_m &= \begin{bmatrix} \hat{X}^e(m) \\ \hat{X}^{o*}(m) \end{bmatrix} \\ &= \begin{bmatrix} \hat{X}_1(2m) \\ \hat{X}_1^*(2m+1) \end{bmatrix} \end{aligned} \tag{15}$$

It must be considered that determination values are obtained in a time domain although channel equalization is performed in a frequency domain. Therefore, an estimation value of a transmission symbol is expressed as the following Equation 16.

$$\hat{x}^e = W_{\frac{N}{2}}^H \hat{X}^e,$$
$$\hat{x}^o = W_{\frac{N}{2}}^H \hat{X}^o$$
$$\hat{x} = \left[\hat{x}^e(0), \hat{x}^o(0), \hat{x}^e(1), \hat{x}^o(1), \ldots, \hat{x}^e\left(\frac{N}{2}-1\right), \hat{x}^o\left(\frac{N}{2}-1\right)\right]^T$$
(16)

When the communication system according to the present invention is compared with the conventional systems (such as an STBC-OFDM, an SFBC-OFEM, and STBC-FDE systems), in view of system complexity, it can be summarized as shown in Table 1.

TABLE 1

| Classification | Number of Complex Multiplication |
| --- | --- |
| STBC (SFBC) OFDM | $(N/2)(3\log_2 N + 6)$ |
| STBC SC-FDE | $N(\log_2 N + 3)$ |
| SFBC SC-FDE | $(N/2)(2\log_2 N + 9)$ |

The presented operation amount has been obtained by calculating a mean value based on one block. Compared with the STBC or SFBC system, in view of relative complexity, the communication system of the present invention provides a calculation-amount reduction effect of 12.5% or 18.2% when N=16 or N=512, respectively. Also, compared with the STBC SC-FDE, it can be understood that the communication system of the present invention requires equation amount incremented by approximately 16.7% or 11.5% when N=16 or N=512, respectively.

Hereinafter, the result of a performance test for the communication system according to the present invention will be described with reference to the accompanying graphs.

In this test, each bit error rate (BER) is measured with respect to four types of 2×1 antenna systems, that is, with respect to the STBC-OFDM, SFBC-OFDM, and STBC-FDE systems, and the SFBC SC-FDE system according to the present invention. Herein, it is assumed that each reception device has precise information about channel states, and an SC system has an ideal pulse form capable of being perfectly reconstructed. In addition, a CP is set to have a length equal to the order of a channel, and the equalizer of each reception device is set to follow the minimum mean square error criterion.

Figure 5:
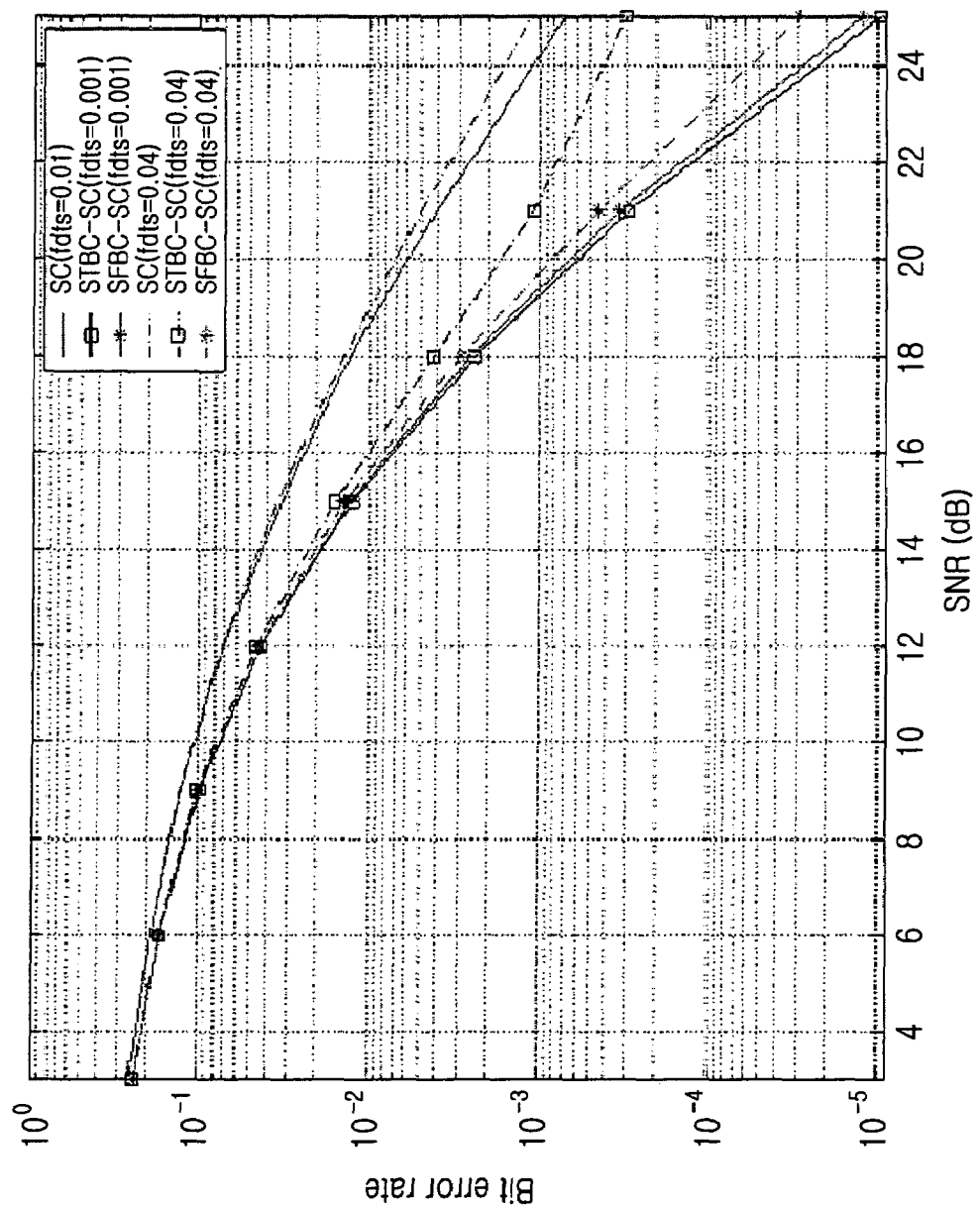
FIG. 5 is a graph illustrating a result of a performance comparison test between the SFBC SC-FDE-based communication system of the present invention and the conventional (STBC) SC-FDE-based communication system.
Figure 6:
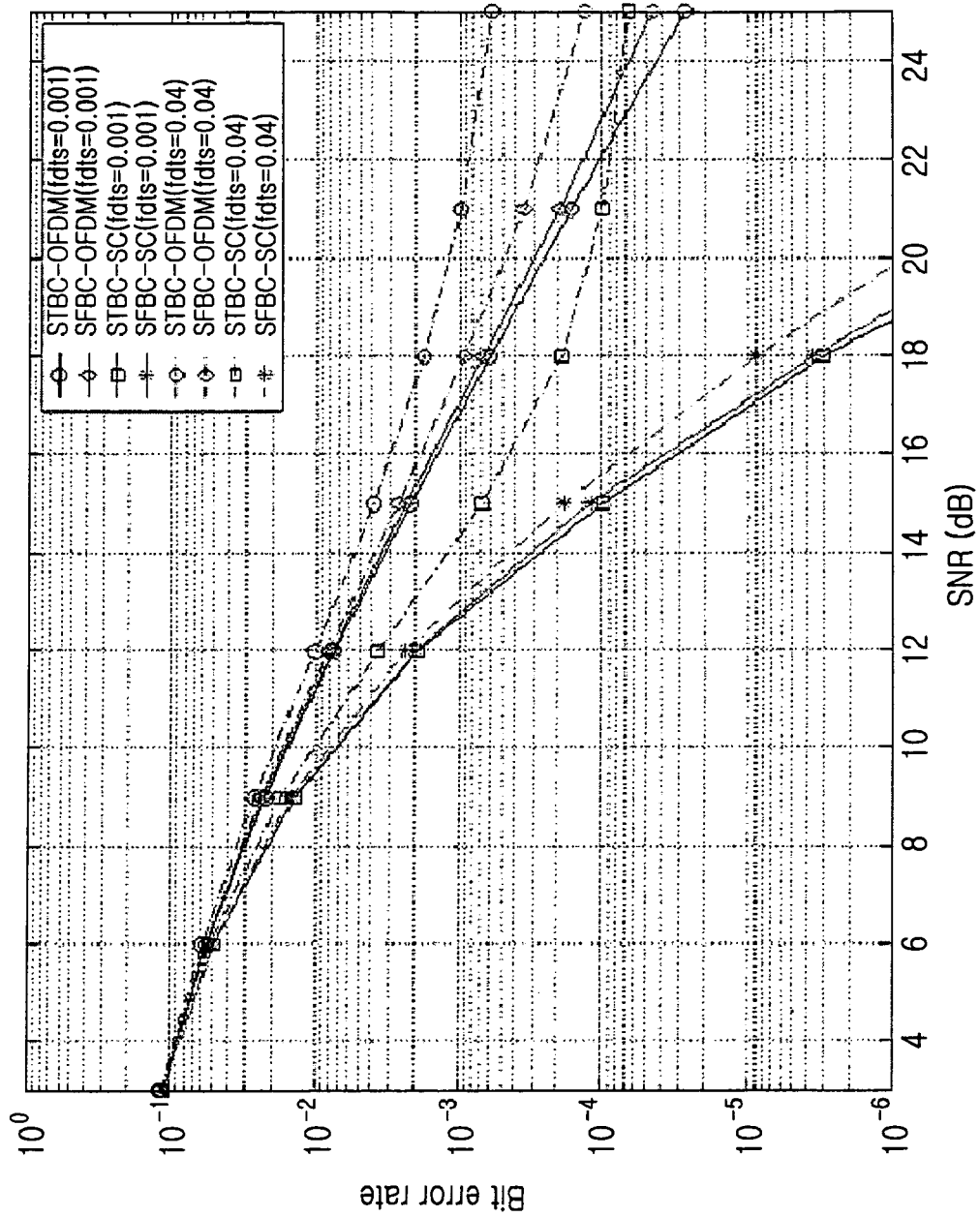
FIG. 6 is a graph illustrating a result of a performance test between OFDM systems and SC systems, to each of which STBC and SFBC transmission diversity techniques are selectively applied.

FIG. 5 is a graph illustrating a result of a performance comparison test between the SFBC SC-FDE-based communication system of the present invention and the conventional STBC SC-FDE-based communication system, with respect to a quasistatic (normalized Doppler frequency $f_d t_s$=0.001) and fast fading channel. This test is performed by using a typical urban (TU) channel for an EDGE (Enhanced Data rates for GSM Evolution) scheme, having been proposed as the third-generation TDMA (Time Division Multiple Access) cellular standard. FIG. 6 is a graph illustrating a result of a performance test between OFDM systems and SC systems, to each of which STBC and SFBC transmission diversity techniques are selectively applied. A COST 207 6 tap TU channel used in this test has a root mean square (RMS) delay spread of approximately 2.3 μs, and has been known as a channel having a superior frequency-selective property. As this test is intended to compare performance degradation in a fast fading channel environment, 512-point fast Fourier transformation is performed in order to minimize an influence of the frequency-selective property.

Referring to FIGS. 5 and 6, in the case of a channel having a large Doppler spread, it can be understood that the SC transmission scheme employing the SFBC technique has superior BER performance in comparison to other schemes employing the STBC technique. For example, when a target BER is "$10^{-4}$" in an EDGE TU channel, the conventional STBC SC-FDE system is subjected to performance degradation of approximately 5 dB, while the SFBC SC-FDE system of the present invention is subjected to performance degradation of only approximately 0.7 dB. Also, as shown in FIG. 6, in the case of transmission of an uncoded signal, it can be understood that the SC scheme provides superior performance to the OFDM scheme. If an adaptive bit loading or channel coding block is added to an OFDM system, the OFDM system has performance similar to the SC-FDE system.

As described above, when employing an SC-FDE system to which an SFBC is applied, the communication system of the present invention has obtained the advantages of both the SFBC and the SC-FDE system. That is, the communication system of the present invention is robust against a non-linear distortion or carrier synchronization error, and can minimize performance degradation even in a fast fading environment while having a transmission diversity gain. In addition, the SFBC-based SC-FDE system of the present invention has another advantage in that it can be easily applied to general multiple input multiple output antenna systems.

While the present invention has been shown and described with reference to certain preferred embodiments thereof, it will be understood by those skilled in the art that various changes in form and details may be made therein without departing from the spirit and scope of the invention as defined by the appended claims. Accordingly, the scope of the invention is not to be limited by the above embodiments but by the claims and the equivalents thereof.

What is claimed is:

1. A method for transmitting data in a communication system, which includes a transmission device and a reception device, in which the transmission device transmits a signal through at least two transmission antennas, and the reception device receives a signal through at least one reception antenna, the method comprising:

encoding an input signal into frequency-domain blocks, and outputting at least two signal blocks in parallel to each other; and inserting a cyclic prefix (CP) into the output signal blocks, and outputting the signal blocks through each corresponding antenna by loading the signal blocks on a single carrier, wherein outputting the at least two signal blocks in parallel to each other comprises: demultiplexing N number of input signals to separate the input signals into even-numbered transmission samples and odd-numbered transmission samples, which have a period of N/2; and generating a first signal block and a second signal block by using the even-numbered and odd-numbered transmission samples.

2. The method as claimed in claim 1, wherein the generating the first signal block comprises generating a first phase-shifted signal by multiplying each odd-numbered transmission sample by a phase shift coefficient;

generating a first accumulation signal by adding the first phase-shifted signal and the even-numbered transmission sample;

generating a first normalized signal by multiplying the first accumulation signal by a normalization coefficient; and grouping first normalized signals corresponding to the N input signals into the first signal block.

3. The method as claimed in claim 1, wherein the generating the second signal block comprises performing a complex conjugate operation with respect to the odd-numbered transmission sample and the even-numbered transmission sample, which correspond to each input signal, thereby generating a complex conjugate signal;

generating a second phase-shifted signal by multiplying the complex conjugate signal by a phase shift coefficient;

generating a second accumulation signal by adding the complex conjugate signal and the second phase-shifted signal;

generating a second normalized signal by multiplying the second accumulation signal by a normalization coefficient; and grouping second normalized signals corresponding to the N input signals into the second signal block.

4. A method for receiving data in a communication system, which includes a transmission device and a reception device, in which the transmission device transmits a signal through at least two transmission antennas, and the reception device receives a signal through at least one reception antenna, the method comprising:

receiving signals output from at least two different transmission antennas through a single carrier by means of one reception antenna;

removing a CP from the received signal;

performing a serial to parallel conversion operation with respect to the CP-removed signal;

performing Fourier transformation with respect to the parallel signals;

detecting an even-numbered frequency component and an odd-numbered frequency component from the Fourier-transformed signals;

demultiplexing the frequency components;

performing inverse Fourier transformation with respect to an even-numbered frequency component of the demultiplexed frequency components;

performing a complex conjugate operation with respect to an odd-numbered frequency component of the demultiplexed frequency components;

performing inverse Fourier transformation with respect to the frequency component having been subjected to the complex conjugate operation; and multiplexing signals, which has been subject to the inverse Fourier transformation and has been output, thereby restoring original data.

5. The method as claimed in claim 4, wherein detecting the frequency components comprises:

linearly-combining the Fourier-transformed frequency components based on a minimum mean square error criterion; and performing frequency-domain equalization with respect to the linearly-combined frequency component.

6. A communication system comprising:

a transmission device for transmitting a signal through at least two transmission antennas; and a reception device for receiving a signal through at least one reception antenna, wherein the transmission device comprises:

a symbol mapping unit for mapping input information bits to symbols;

a demultiplexer for demultiplexing the symbols output from the symbol mapping unit;

a symbol processing unit for processing parallel symbols output from the demultiplexer, thereby outputting at least two signal blocks as frequency-domain blocks in parallel to each other; and a cyclic prefix (CP) insertion unit for inserting a CP into the signal blocks output in parallel from the symbol processing unit, and then transmitting the signal blocks, wherein the demultiplexer demultiplexes N number of input signals to separate the N input signals into even-numbered transmission samples and odd-numbered transmission samples, which have a period of N/2 and then outputs the even-numbered and odd-numbered transmission samples.

7. A single-carrier-based communication system comprising: a transmission device for transmitting a signal through at least two transmission antennas; and a reception device for receiving a signal through at least one reception antenna, wherein the transmission device comprises:

a virtual frequency-domain block encoder for processing an input signal, and outputting signal blocks, which have a frequency-domain-encoded effect, in parallel to each other; and a cyclic prefix (CP) insertion unit for inserting a cyclic prefix into the signal blocks, and transmitting the signal blocks through corresponding transmission antennas, wherein the virtual frequency-domain block encoder comprises:

a demultiplexer for demultiplexing N number of input signals to separate the N input signals into even-numbered transmission samples and odd-numbered transmission samples, which have a period of N/2, and then outputting the even-numbered and odd-numbered transmission samples; and a signal block generator for generating an even-numbered signal block and an odd-numbered signal block by using the even-numbered and odd-numbered transmission samples of the input signals.

8. The communication system as claimed in claim 7, wherein the signal blocks, into which the cyclic prefix has been inserted, are transmitted at the same time through a single carrier.

9. The communication system as claimed in claim 7, wherein the signal block generator comprises N number of signal processing modules for processing the input signals.

10. The communication system as claimed in claim 9, wherein each of the signal processing modules comprises:

a first multiplier for multiplying the odd-numbered transmission sample by a phase shift coefficient, thereby generating a first phase-shifted signal;

a first adder for adding the first phase-shifted signal and the even-numbered transmission sample, thereby generating a first accumulation signal;

a second multiplier for multiplying the first accumulation signal by a normalization coefficient, thereby generating a first normalized signal;

a complex conjugate module for performing a complex conjugate operation with respect to the even-numbered and odd-numbered transmission samples, thereby generating a complex conjugate signal;

a third multiplier for multiplexing the complex conjugate signal by a phase shift coefficient, thereby generating a second phase-shifted signal;

a second adder for adding the second phase-shifted signal and the complex conjugate signal, thereby generating a second accumulation signal; and a fourth multiplier for multiplying the second accumulation signal by the normalization coefficient, thereby generating a second normalized signal.

11. The communication system as claimed in claim 10, wherein the even-numbered signal block is generated by combining first normalized signals, which have been generated in correspondence with the N input signals.

12. The communication system as claimed in claim 10, wherein the odd-numbered signal block is generated by combining second normalized signals, which have been generated in correspondence with the N input signals.

13. A communication system comprising:

a transmission device for transmitting a signal through at least two transmission antennas; and a reception device for receiving a signal through at least one reception antenna, wherein the reception device comprises:

a cyclic prefix (CP) removing unit for removing a CP from a received signal;

a serial to parallel converter for performing serial/parallel conversion with respect to a signal, from which a CP is removed by the CP removing unit;

a Fourier transform unit for performing Fourier transformation with respect to signals output in parallel from the serial to parallel converter;

a signal block detector for detecting an even-numbered frequency component and an odd-numbered frequency component by using an output signal of the Fourier transform unit;

a demultiplexer for demultiplexing the frequency components detected by the signal block detector;

a first inverse Fourier transform unit for performing inverse Fourier transformation with respect to an even-numbered frequency component of signals output from the demultiplexer;

a complex conjugate operator for performing a complex conjugate operation with respect to an odd-numbered frequency component of signals output from the demultiplexer;

a second inverse Fourier transform unit for performing inverse Fourier transformation with respect to an output signal of the complex conjugate operator; and a multiplexer for multiplexing output signals of the first and second inverse Fourier transform units, thereby restoring original data.

14. The communication system as claimed in claim 13, wherein the signal block detector comprises:

a linear combiner for combining the output signals of the Fourier transform unit based on a minimum mean square error criterion; and a single-carrier frequency domain equalizer for performing frequency domain equalization with respect to an output signal of the linear combiner.

* * * * *